Patented Aug. 15, 1950

2,518,477

UNITED STATES PATENT OFFICE 2,518,477

MEROCYANINE DYESTUFFS AND INTERMEDIATES

John David Kendall and Frank Peter Doyle, Ilford, England, assignors to Ilford Limited, Ilford, England, a British company No Drawing. Application June 3, 1948, Serial No. 30,979. In Great Britain June 4, 1947

9 Claims. (Cl. 260—240.4)

This invention relates to merocyanine dyestuffs.

According to the present invention dyestuffs which are also intermediates for dyestuffs are prepared by reacting a merocarbocyanine dye of the general Formula I:

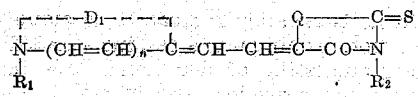

wherein $R_1$ is an alkyl, hydroxyalkyl, aralkyl or hydroxyaralkyl group, $R_2$ is a hydrogen atom or a hydrocarbon group, $D_1$ is the residue of a five-membered or six-membered heterocyclic nitrogen ring, Q is an oxygen atom or a sulphur atom, and $n$ is nought or one, with an acid HX where X is the acid anion and a trithioorthoformate $HC(SR_3)_3$ where $R_3$ is an alkyl or aralkyl group, the reaction being effected in the presence of a carboxylic acid or anhydride which is a solvent for the reacting materials.

The product of the reaction is believed to be a compound of the general Formula II:

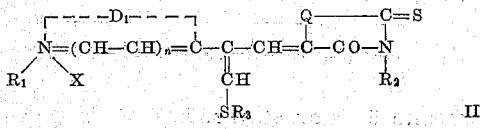

Where in the original material the group $R_1$ contains a hydroxy group, this may be acylated under the conditions of the reaction.

The group $R_1$ is preferably a lower alkyl or hydroxyalkyl group, e. g. methyl, ethyl or propyl groups, or the corresponding hydroxyalkyl groups, e. g. β-hydroxyethyl.

Since in most cases where the product of this invention is used for further condensations, such condensations will result in the removal of the $SR_3$ group, the nature of $R_3$ is not of special importance. For the sake of convenience, however, it may be ethyl, in which case the reagent employed is triethyl trithio-orthoformate which is the most readily obtainable compound of the series. However, it is to be understood that it may be any other alkyl group or aralkyl group, e. g. tribenzyl trithio-orthoformate.

The acid HX may be any strong acid, but the hydrohalic acids, e. g. HCl and HBr, and p-toluene sulphonic acid, are preferred. The solvent acid or anhydride is preferably a weak acid, e. g. acetic acid or acetic anhydride.

The reaction should be effected under substantially anhydrous conditions, i. e. in the absence of any hydrolytic substance, and is best effected by heating the reagents together.

The residue $D_1$ may be selected from the residues of thiazoles, oxazoles, selenazoles and their polycyclic homologues, such as those of the benzene, naphthalene, acenaphthene and anthracene series, pyridine and its polycyclic homologues, such as quinoline and α and β naphthaquinolines, lepidines, indolenines, diazines, such as pyrimidines and quinazolines, diazoles (e. g. thio-β,β'-diazole), oxazolines, thiazolines and selenazolines. The polycyclic compounds of this series may also be substituted in the carbocyclic rings with one or more groups such as alkyl, aryl, amino, hydroxy, alkoxy and methylene-dioxy groups, or by halogen atoms.

The heterocyclic nucleus of which Q is a part may be the residue of rhodanic acid or oxarhodanic acid and their N-substitution derivatives.

The following examples, in which the parts are by weight, illustrate this invention.

EXAMPLE 1

*Preparation of 1-ethylthio-2-benzthiazolyl-3[3'-ethyl - 2' - thio - 4' - keto - tetrahydrothiazolylidene]propene metho-p-toluene sulphonate*

3 - methyl - 2.3 - dihydro - benzthiazolylidene-2.5' - ethylidene - 3'ethyl - 2' - thio - 4' - keto tetrahydrothiazole (3.3 parts), toluene - p - sulphonic acid (2.5 parts), triethyl trithio-orthoformate (2.5 parts) and acetic anhydride (25 parts) were refluxed until a bright yellow colour was present. The solution was then diluted with ether to precipitate an oil which was washed well with ether and then treated with acetone to give a yellow solid which was filtered and washed with acetone and ether. It melted at 210° (with decomposition) and had the structural formula:

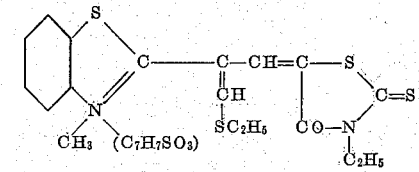

EXAMPLE 2

*Preparation of 1 - ethylthio - 2 - α - quinolyl - 3[3'ethyl - 2' - thio - 4' - keto - tetrahydrothiazolylidene]propene ethiodide.*

1-ethyl-1,2-dihydroquinolylidene-2.5' - ethylidene - 3'ethyl - 2' - thio - 4' - tetrahydrothiazole (3.42 parts), toluene-p-sulphonic acid (3.0 parts), triethyl trithio-orthoformate (3.0 parts) and acetic anhydride (30 parts) were refluxed until a bright yellow colour was present. The solvent was then distilled in vacuo, the residue washed with ether, dissolved in ethyl alcohol and poured into aqueous potassium iodide solution. The yellow crystals which precipitated were filtered, washed with water and ethyl alcohol and purified by boiling out twice with ethyl alcohol to give yellow crystals. M. Pt. 220° (with decomposition) and having the structural formula:

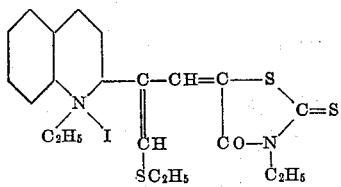

EXAMPLE 3

*Preparation of 1 - ethylthio - 2 - benzthiazolyl - 3 - [3' - ethyl - 2' - thio - 4' - keto - tetrahydro-oxazolylidene]propene ethobromide*

3 - ethyl - 2.3 - dihydro - benzthiazolylidene - 2.5'ethylidine 3' - ethyl - 2' - thio-4'- keto - tetrahydro-oxazole (3.3 parts), hydrobromic acid (1.0 part dissolved in 25 cc. of acetic anhydride-acetic acid mixture) and triethyl trithio orthoformate (2.0 parts) were refluxed for ten minutes. The pale yellow solution was cooled and diluted with ether to give a sticky tar which was washed with ether and then treated with acetone. The resulting pale yellow solid was filtered and washed with acetone to give the desired intermediate, M. Pt. 208° (with decomposition) having the structural formula:

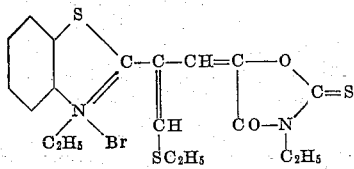

EXAMPLE 4

*Preparation of 1-ethylthio - 2 - (3'.3'dimethyl - indolenyle) - 3 - (3' - ethyl - 2' - thio - 4'keto - tetrahydrothiazolylidene) propene metho - p - toluene sulphonate*

1.3.3.trimethyl indolylidene-2.5'ethylidene-3'-ethyl 2' - thio - 4' - keto - tetrahydrothiazole (3.4 parts), toluene-p-sulphonic acid (2.0 parts) and triethyl trithio orthoformate (2.0 parts) were heated in acetic anhydride (25 parts) for ten minutes. The solution was then diluted with ether to precipitate a sticky orange tar which was washed well with ether. It had the structural formula:

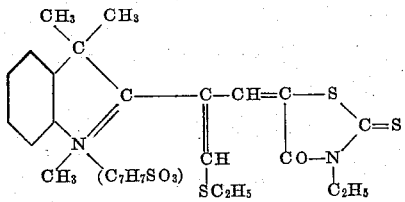

EXAMPLE 5

*Preparation of 1 - ethylthio - 2 - benzoxazolyl-3(3'methyl - 2'thio - 4' - keto - tetrahydrothiazolylidene) - propene metho - p - toluene sulphonate*

3 - methyl - 2.3 - dihydrobenzoxazolylidene - 2.5'ethylidene 3'methyl - 2' - thio - 4'- keto-tetrathiazole (3.0 parts) was reacted with toluene-p-sulphonic acid (2.0 parts) and triethyl trithio orthoformate (2.0 parts) in acetic anhydride (25 parts) as in Example 4. The product was an orange tar having the structural formula:

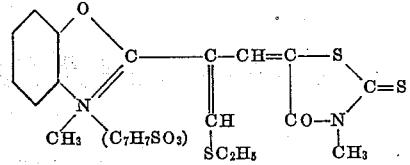

It will be noted that the products of Examples 4 and 5 were left as tars and not recrystallised. Where the intermediates are to be used for the production of trinuclear dyestuffs, for example by the methods of Ser. No. 30,975 filed on even date herewith (for which the products of this invention have especial utility), the purification of the intermediates is not necessary.

What we claim is:

1. Process for the production of merocyanine dyestuffs which comprises reacting a merocarbocyanine dye of the general formula:

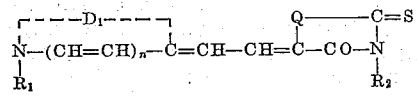

wherein $R_1$ is an alkyl radical, $R_2$ is monovalent hydrocarbon group, $D_1$ is a residue selected from the class consisting of five-membered and six-membered heterocyclic nitrogen rings, Q is selected from the class consisting of the oxygen atom and the sulphur atom and $n$ is nought or one, with an acid HX of which X is the acid anion and a trithio-orthoformate $HC(SR_3)_3$ where $R_3$ is selected from the class consisting of alkyl and aralkyl groups, the reaction being effected in the presence of a condensing agent selected from the class consisting of weak carboxylic acids and their anhydrides, said condensing agent being a solvent for the reactants.

2. Process for the production of merocyanine dyestuffs which comprises reacting a merocarbocyanine dye of the general formula:

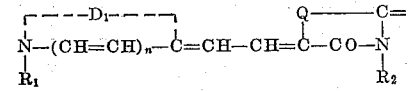

wherein $R_1$ is an alkyl radical, $R_2$ is monovalent hydrocarbon group, $D_1$ is a residue selected from the class consisting of five-membered and six-membered heterocyclic nitrogen rings, Q is selected from the class consisting of the oxygen atom and the sulphur atom and $n$ is nought or one, with a hydrohalic acid and a trithio-orthoformate $HC(SR_3)_3$ where $R_3$ is selected from the class consisting of alkyl and aralkyl groups, the reaction being effected in the presence of a condensing agent selected from the class consisting of weak carboxylic acids and their anhydrides, said condensing agent being a solvent for the reactants.

3. Process for the production of merocyanine dyestuffs which comprises reacting a merocarbocyanine dye of the general formula:

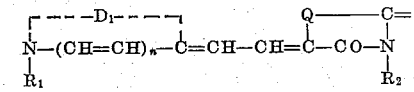

wherein $R_1$ is an alkyl radical, $R_2$ is monovalent hydrocarbon group, $D_1$ is a residue selected from the class consisting of five-membered and six-membered heterocyclic nitrogen rings, Q is selected from the class consisting of the oxygen atom and the sulphur atom and $n$ is nought or one, with an acid HX of which X is the acid anion and triethyl trithio orthoformate, the reaction being effected in the presence of a condensing agent selected from the class consisting of weak carboxylic acids and their anhydrides, said condensing agent being a solvent for the reactants.

4. Process for the production of merocyanine dyestuffs which comprises reacting a merocarbocyanine dye of the general formula:

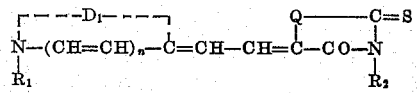

wherein $R_1$ is an alkyl radical, $R_2$ is monovalent hydrocarbon group, $D_1$ is a residue selected from the class consisting of five-membered and six-membered heterocyclic nitrogen rings, Q is selected from the class consisting of the oxygen atom and the sulphur atom and $n$ is nought or one, with an acid HX of which X is the acid anion and a trithio-orthoformate $HC(SR_3)_3$ where $R_3$ is selected from the class consisting of alkyl and aralkyl groups, the reaction being effected in the presence of acetic anhydride.

5. A compound of the general formula:

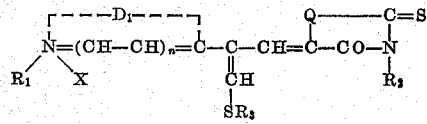

wherein $R_1$ is an alkyl radical, $R_2$ is selected from the class consisting of the hydrogen atom and hydrocarbon groups, $D_1$ is a residue selected from the class consisting of five-membered and six-membered heterocyclic nitrogen rings, Q is selected from the class consisting of the oxygen atom and the sulphur atom and $n$ is nought or one, $R_3$ is selected from the class consisting of alkyl and aralkyl groups and X is an acid radical.

6. Process for the production of merocyanine dyestuffs which comprises reacting a compound of the formula:

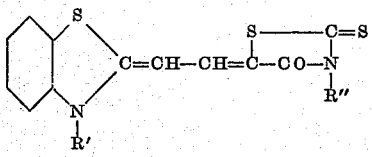

where R' is an alkyl radical and R'' is a hydrocarbon radical with a hydrohalic acid and triethyl trithio orthoformate in the presence of acetic anhydride by heating the mixture under substantially anhydrous conditions.

7. Process for the production of merocyanine dyestuffs which comprises reacting a compound of the formula:

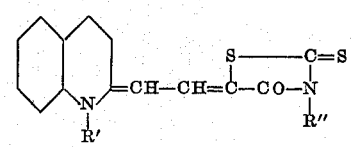

where R' is an alkyl radical and R'' is a hydrocarbon radical with p-toluene sulfonic acid and triethyl trithio orthoformate in the presence of acetic anhydride by heating the mixture under substantially anhydrous conditions.

8. Process for the production of merocyanine dyestuffs which comprises reacting a compound of the formula:

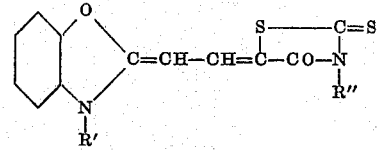

where R' is an alkyl radical and R'' is a hydrocarbon radical with p-toluene sulfonic acid and triethyl trithio orthoformate in the presence of acetic anhydride by heating the mixture under substantially anhydrous conditions.

9. The merocyanine compound of the formula:

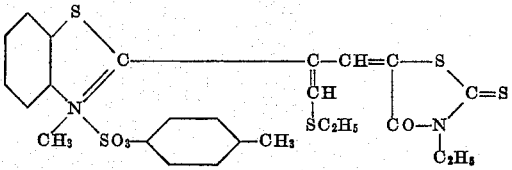

JOHN DAVID KENDALL.
FRANK PETER DOYLE.

No references cited.